US 6,816,201 B1

(12) United States Patent
Fang et al.

(10) Patent No.: US 6,816,201 B1
(45) Date of Patent: Nov. 9, 2004

(54) XDS ENHANCEMENT SYSTEM

(75) Inventors: James Fang, Newport Beach, CA (US);
Carl Blankenburg, Laguna Hills, CA
(US)

(73) Assignee: Mitsubishi Digital Electronics America, Inc., Irvine, CA (US)

(*) Notice: Subject to any disclaimer, the term of this patent is extended or adjusted under 35 U.S.C. 154(b) by 0 days.

(21) Appl. No.: 09/007,197

(22) Filed: Jan. 13, 1998

(51) Int. Cl.[7] .................. H04N 5/445; H04N 7/087
(52) U.S. Cl. ............... 348/468; 348/465; 348/473; 348/478; 348/552; 725/51; 725/112; 725/136; 725/141
(58) Field of Search .................. 348/465, 468, 348/473, 460, 478, 461, 552, 563, 565, 564, 13, 477, 467; 455/4.2, 5.1, 6.3; 725/141, 74, 51, 112, 136, 153; 345/718, 716, 717, 719; H04N 5/445, 7/087

(56) References Cited

U.S. PATENT DOCUMENTS

| | | | | |
|---|---|---|---|---|
| 5,438,372 A | * | 8/1995 | Tsumori et al. | 348/563 |
| 5,481,296 A | * | 1/1996 | Cragun et al. | 348/13 |
| 5,500,680 A | * | 3/1996 | Lee | 348/468 |
| 5,512,954 A | * | 4/1996 | Shintani | 348/468 |
| 5,537,151 A | * | 7/1996 | Orr et al. | 348/564 |
| 5,576,768 A | * | 11/1996 | Gomikawa | 348/468 |
| 5,703,655 A | * | 12/1997 | Corey et al. | 348/468 |
| 5,751,335 A | * | 5/1998 | Shintani | 348/460 |
| 5,761,606 A | * | 6/1998 | Wolzien | 725/110 |
| 5,818,441 A | * | 10/1998 | Throckmorton et al. | 348/13 |
| 5,818,935 A | * | 10/1998 | Maa | 348/467 |
| 5,946,046 A | * | 8/1999 | You et al. | 348/468 |
| 5,961,603 A | * | 10/1999 | Kundel et al. | 709/229 |
| 5,969,769 A | * | 10/1999 | Hamadate | 348/565 |
| 5,995,159 A | * | 11/1999 | Bae et al. | 348/563 |
| 5,999,970 A | * | 12/1999 | Krisbergh et al. | 348/12 |
| 6,002,394 A | * | 12/1999 | Schein et al. | 348/13 |
| 6,061,719 A | * | 5/2000 | Bendinelli et al. | 709/218 |
| 6,064,420 A | * | 5/2000 | Harrison et al. | 348/12 |
| 6,064,438 A | * | 5/2000 | Miller | 348/465 |
| 6,209,132 B1 | * | 3/2001 | Harrison et al. | 725/141 |

* cited by examiner

Primary Examiner—Michael H. Lee
Assistant Examiner—Jean W. Désir
(74) Attorney, Agent, or Firm—Orrick, Herrington & Sutcliffe LLP

(57) ABSTRACT

A television system and method for facilitating use of closed caption text or other information that may be included in an extended data service (XDS) system. The system includes a tuner adapted to receive a television signal, the television signal including a video signal and an XDS signal, and a television display for displaying a video image corresponding to the video signal. A data slicer coupled to the tuner extracts the XDS signal from the television signal, and sends the XDS signal out a data port to a peripheral device, such as a text display. The text display may be used to display text information included in the XDS signal, such as closed caption and/or other information included in text fields of the XDS signal. Alternatively, a computer may be coupled to the data port to monitor information, such as URL data, in the XDS signal to access on-line information. The computer may also be used toe control the tuner and/or other components of the system in response to information included in the XDS signal.

20 Claims, 2 Drawing Sheets

XDS ENHANCEMENT SYSTEM

FIELD OF THE INVENTION

The present invention relates generally to television closed caption and other extended data service (XDS) systems, and more particularly to a system and method for enhancing the use of XDS data by television viewers.

BACKGROUND

Generally, television systems now provide, along with conventional broadcast information, an extended data service (XDS) system. The standard that has been adopted, EIA-608, also referred to as the closed caption standard, is directed to providing various types of information to television viewers. Although the current XDS system is capable of providing closed caption information as well as four additional fields of text or other data, only the closed captioning field has been widely used, typically to provide dialogue text across a television screen to assist hearing-impaired viewers.

Closed caption television sets include a tuner for receiving a television signal from a source of information, such as from over-the-air transmission, cable or other recorded source, and produces a video signal, for example, corresponding to a selected channel. The video signal is delivered to a television screen which displays a video image corresponding to the video signal. An XDS signal is generally carried along with the video signal in the television signal in a field that is not normally included in the video image displayed on the television screen.

A data slicer strips or duplicates the XDS signal from the video signal, and delivers it to a microcomputer. The microcomputer includes a user interface which allows the user to turn closed captioning on and off, and to select either closed caption mode or text mode. A closed caption video generator then receives the XDS signal and converts the text information in the XDS signal for display on the television screen.

A significant drawback of conventional closed caption televisions is that the text displayed from the XDS signal obscures a portion of or all of the video image on the television screen. For example, in closed caption mode, the closed caption information in the XDS signal is generally displayed across a bottom portion of the television screen, blocking the underlying video image provided from the video signal. In addition, because of the variety of television sizes available, the closed caption text may not fit well on an individual television screen, i.e. the text may extend into the edges of the television screen, and/or the text may have imperfect persistence.

In text mode, one of the four text fields included in the XDS signal may be displayed, each field possibly including additional information, such as, news or weather reports. When a text field is displayed, however, it replaces the entire video image on the television screen, preventing the viewer from seeing any video image when text mode is selected. In addition, each text field may only be viewed individually, requiring the viewer to toggle between each field if he/she wishes to read all of the text information included in the XDS signal.

Therefore, there is a need for a system which allows a television viewer to more effectively use the information that may be available from an XDS system included in a television broadcast signal.

SUMMARY OF THE INVENTION

The present invention is directed to a television system and method for facilitating use of text or other information that may be included in an extended data service (XDS) system. In a first preferred embodiment, the system includes a tuner adapted to receive a television signal, the television signal including a video signal and an XDS signal. A video display receives the video signal from the tuner to produce a video image, i.e. a normal television image.

A data slicer is coupled to the tuner adapted to extract, e.g. strip or duplicate, the XDS signal from the television signal. A data port, preferably a dedicated RS-232 connector or other serial port, is coupled to the data slicer for providing an output of the XDS signal to one or more peripheral devices, i.e. that are isolated or remote from the video display.

In a first preferred embodiment, the system includes a text display which is coupled to the data port for displaying text information included in the XDS signal. The text display may be mounted adjacent the television display or may be a remote device.

Alternatively, in a second preferred embodiment, the system includes a computer coupled to the data port for monitoring information in the XDS signal. The computer preferably includes a processor for interpreting URL data in the XDS signal and a connection to an on-line service, whereby the computer may access on-line information in response to the URL data, for example accessing a website on the Internet and the like. The computer may also include a controller for controlling the tuner and/or other components of the system in response to information included in the XDS signal.

The system may also include an XDS or closed caption video generator coupled to the data slicer and adapted to display text information, for example closed caption information, included in the XDS signal on the video display. A control system may be provided for selectively activating the XDS video generator and/or the data port, and for selecting a display mode for the text information, the display mode including a closed caption mode and a text mode.

More particularly, the system of the present invention is directed to a television for selectively displaying XDS data included in a television signal without interfering with the video image presented on the television display. The television includes a first display adapted to receive a video signal to display a video image defined by the video signal. The television also includes a second display remote from the first display and adapted to receive an XDS signal to display a text image defined by the XDS signal. Thus, a television in accordance with the present invention allows a user to view the closed caption or other text information in the XDS signal on the text display without interfering with the video image on the television display.

In accordance with the present invention, a method of selectively using XDS data included in a television signal may be followed, wherein a television signal including a video signal and an XDS signal is received by a tuner. A video image corresponding to the video signal is displayed on a video display coupled to the tuner. The XDS signal is extracted from the television signal, and the XDS signal is sent out a data port to a peripheral device remote from the video display.

Accordingly, a principal object of the present invention is to provide a system and method that allow a television viewer to more effectively use the closed caption and other information included in an XDS signal provided in television broadcast signals.

It is also an object to provide a television system that allows a television viewer to access closed caption, text and/or other information included in an XDS signal of a television broadcast signal, without interfering with use of the television display.

Other objects and features of the present invention will become apparent from consideration of the following description taken in conjunction with the accompanying drawings.

DETAILED DESCRIPTION OF THE PREFERRED EMBODIMENTS

Figure 1:
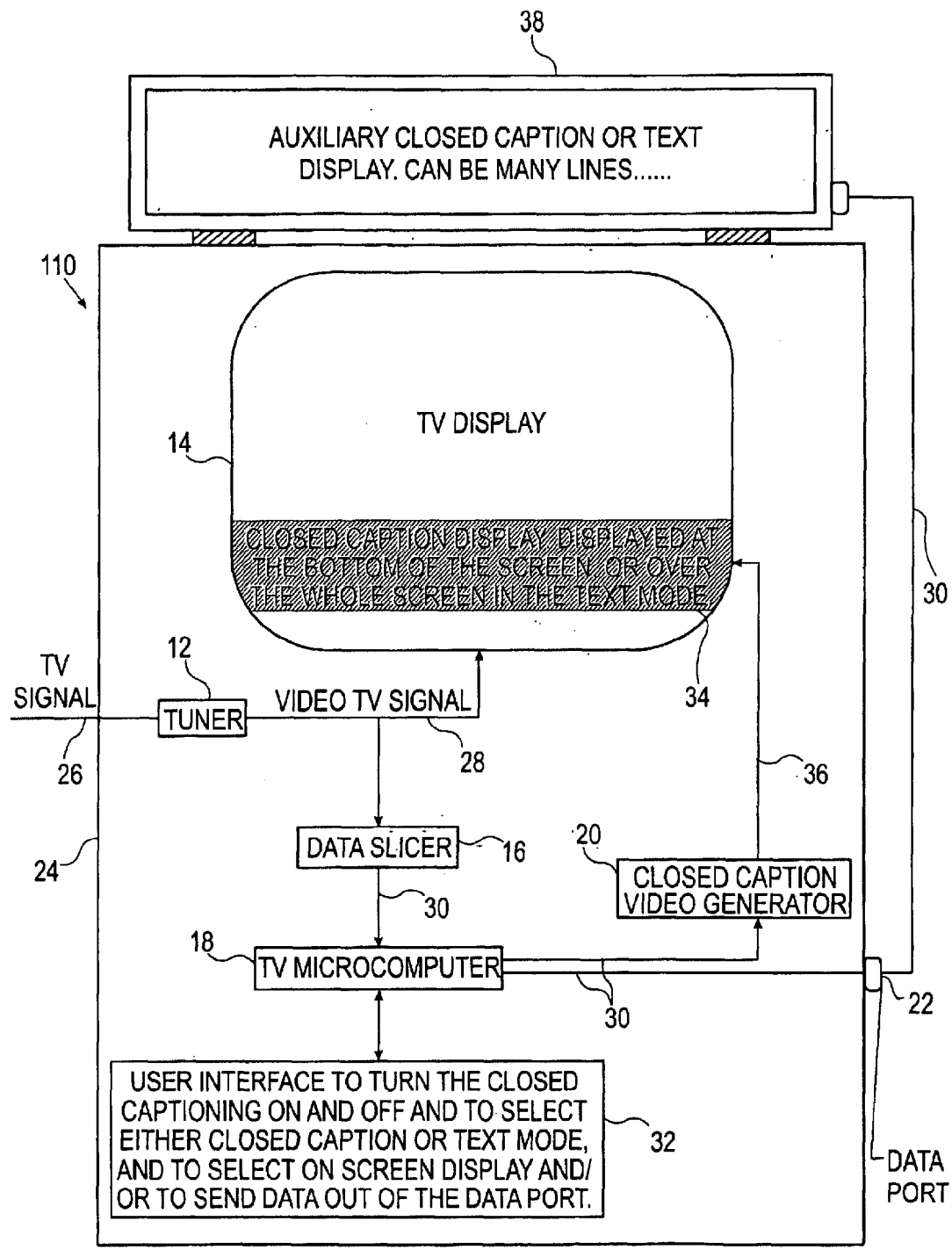
FIG. 1 is a schematic view of a first preferred embodiment of a television system in accordance with the present invention.

Turning now to the drawings, FIG. 1 shows a first preferred embodiment in accordance with the present invention, namely a television 10. The television 10 includes a tuner 12, a television display 14, a data slicer 16, a microcomputer 18, an XDS or closed caption video generator 20, and a data port 22, all contained within a casing 24. The tuner 12 receives a signal 26, for example a television broadcast signal from over-the-air transmission, cable or a recorded source, which the tuner 12 converts into a video signal 28. The video signal 28 is delivered to the television display 14, preferably a conventional television screen, which displays a video image (not shown) corresponding to the video signal 28.

The data slicer 16 is coupled to the tuner and extracts an XDS signal 30 carried by the video signal 28, for example by stripping or duplicating the XDS signal 30. The microcomputer 18, or a similar control system made from discrete and/or integrated components, is coupled to the data slicer 16 and includes a user interface 32, allowing a viewer to turn closed captioning on and off, to select either closed caption mode or text mode, to select on-screen display and/or to send the XDS signal 30 out the data port 22.

The closed caption video generator 20 and the data port 22 are each coupled to and controlled by the microcomputer 18. The closed caption video generator 20 is coupled between the microcomputer 18 and the television display 14, as is described more particularly below. The data port 22 is preferably a serial port, for example a dedicated RS-232 connector, allowing the television viewer to attach one or more peripheral devices to the television 10 to use the XDS signal 30.

In the first preferred embodiment of FIG. 1, the television includes a text display 38 for displaying closed captioning and/or one or more text fields included in the XDS signal 30. The text display 38 may be mounted, either detachably or permanently, onto the casing 24 as shown, thereby allowing the text information on the text display 38 to be viewed without interfering with the video image on the television display 14. Alternatively, the text display 38 may be mounted directly in the casing 24 (not shown) or elsewhere adjacent to the television display 14. The text display 38 may be one of a variety of known display screens, for example a liquid crystal display (LCD), a light emitting display (LED), or a fluorescent display, and may include enlarged or enhanced text imaging to facilitate viewing, as will be appreciated by those skilled in the art.

During use, if, for example, a viewer selects closed caption mode and on-screen display, the XDS signal 30 is delivered to the closed caption video generator 20. The closed caption video generator 20 converts the text information in the XDS signal 30 into an output 36 to provide a closed caption display 34 on the television display 14. The closed caption display 34 is superimposed on the television display 14 over the video image (not shown) provided by the video signal 28, similar to a conventional closed caption television set.

In addition, a viewer may select to send the XDS signal 30 out the data port 22, i.e. to the text display 38, in addition to or rather than to the television display 14. This allows the viewer to read the closed caption information without obscuring the video image on the television display 14. In addition, the text display 38 preferably is capable of displaying more than one text field from the XDS signal 30, thereby allowing, for example, closed caption and other text information to be displayed simultaneously on the text display 38. Thus, a viewer of the television 10 may access and/or view additional information which broadcasters may include in the XDS signal 30, such as upcoming television programming, ratings information, movie reviews, and the like, to decide what programming to watch, etc., thereby maximizing their use of the additional resources available from the XDS system while minimizing interference with their viewing of the normal video image on the television display 14.

Figure 2:
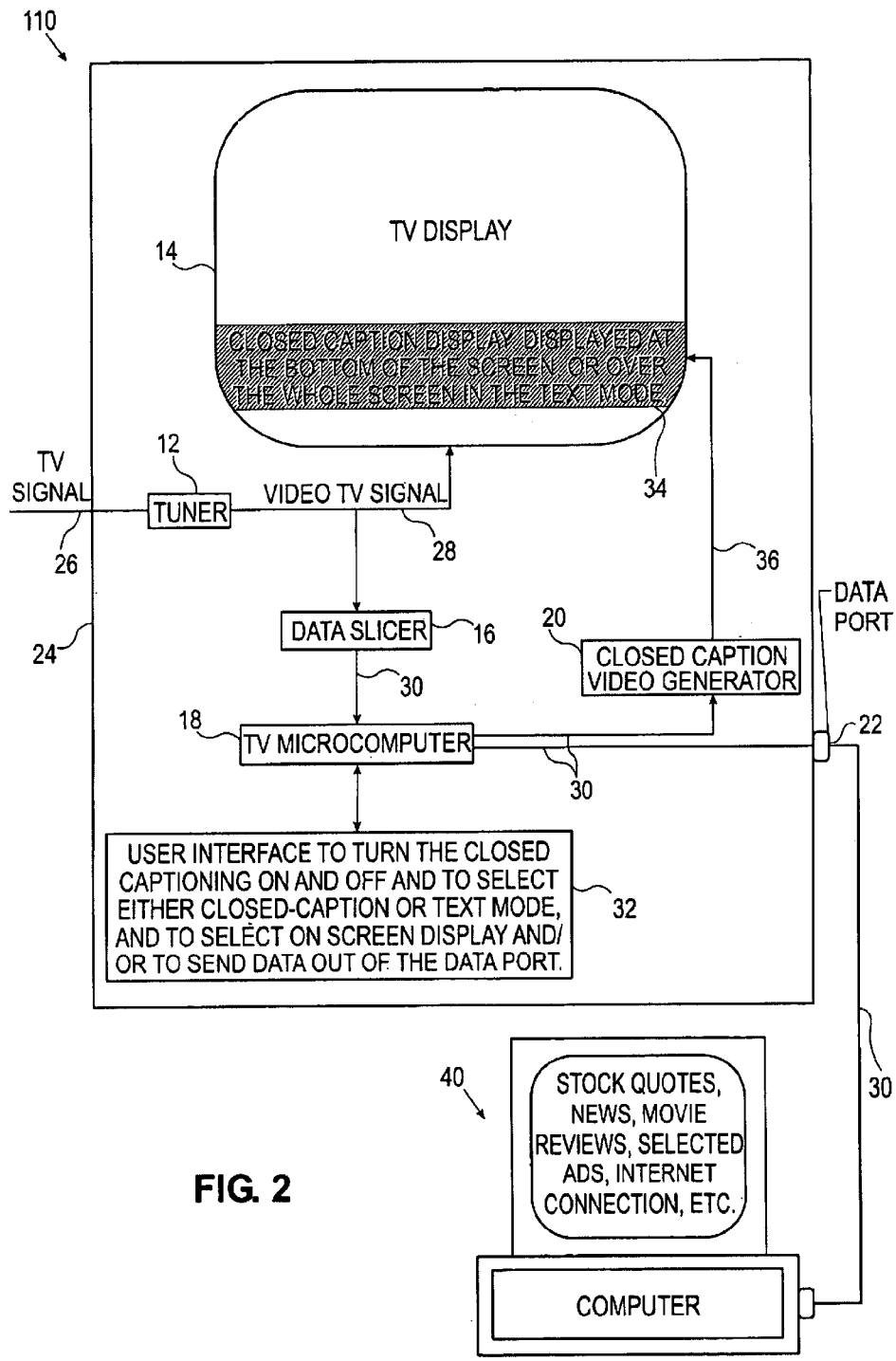
FIG. 2 is a schematic view of a second preferred embodiment of a television system in accordance with the present invention.

Turning to FIG. 2, a second preferred embodiment of a television system 110 in accordance with the present invention is shown. Similar to the preferred embodiment described previously, the television system 110 includes a tuner 12, a television display 14, a data slicer 16, a microcomputer 18, a closed caption video generator 20, and a data port 22.

In addition, the television system 110 includes a computer 40 which is coupled to the data port 22. The computer 40 includes a processor (not shown) which is adapted to interpret the XDS data included in the XDS signal 30. For example, the information included in the text fields of the XDS signal 30 may include URL data or similar commands. The processor may store the URL data for future use and/or may allow the television viewer to immediately use the URL data to access an on-line information, such as an Internet website, for example which may be referenced or particularly relevant to the programming being watched on the television display 14. This allows the computer 40 and the television display 14 to be used independently or in cooperation, thereby allowing the XDS data to augment rather than interfere with normal television viewing.

In addition, the computer 40 may include a controller or other I/O port (not shown) which may be used to control one or more components of the television system 110, for example, the tuner 12 and/or the microcomputer 18. The television viewer may then manually direct the computer 40 to control the desired component, for example using a keyboard or remote control device. Alternatively, the viewer may preselect parameters to allow the computer 40 to automatically control the television system 110, for example, to use information included in the XDS signal 30 to assist in program selection, to provide cooperative television and Internet/Web access and/or to otherwise improve normal television viewing.

In additional alternatives, an infrared transmitter (not shown) may be coupled to the data port 22 for sending out bursts of XDS data, for example on an IR blaster line. The XDS data may then be transmitted to a remote video monitor, for example a hand-held video device (not shown), or to another remote device, such as a remote control (not shown).

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A system for facilitating use of extended data service (XDS) data by a television user, comprising:
   a tuner adapted to receive a television signal, the television signal including a video signal and an XDS signal;
   a video display for receiving the video signal from the tuner to produce a video image;
   a data slicer coupled to the tuner adapted to extract the XDS signal from the television signal;
   a data port coupled to the data slicer for providing an output of the XDS signal to a peripheral device; and
   a computer coupled to the data port for monitoring information in the XDS signal, the computer comprising a display;
   wherein the computer includes a connection to an on-line service and a processor for interpreting URL data in the XDS signal and without user intervention displaying on-line information in response to the URL data on a display independently of the video display and simultaneously with the video image produced from the video signal.

2. A method of selectively using extended data service (XDS) data included in a television signal, the method comprising the steps of:
   receiving a television signal by a tuner, the television signal including a video signal and an XDS signal;
   displaying a video image corresponding to the video signal on a video display coupled to the tuner;
   extracting the XDS signal from the television signal, the XDS signal comprising closed captioning data and other textual data;
   sending the XDS signal out a data port to a peripheral device remote from the video display; and
   selectively displaying either the closed captioning data or non-XDS signal program data associated with the other textual data on the peripheral device simultaneously with the video image corresponding to the video signal on the video display.

3. The method of claim 2, wherein the peripheral device comprises a text display.

4. The method of claim 2, comprising the additional step of selectively activating or deactivating the display of closed caption and other textual data in the XDS signal on the video display.

5. The method of claim 2, wherein the peripheral device comprises a computer.

6. The method of claim 5, comprising the additional step of monitoring the XDS signal with the computer for the programming-related data.

7. The method of claim 6 comprising the additional step of selectively controlling the tuner of the television with the computer in response to the programming-related data.

8. The method of claim 2, wherein the peripheral device comprises a hand-held video device.

9. The method of claim 2, wherein the step of sending XDS data to the peripheral device comprises transmitting the XDS data via an infrared transmitter to the peripheral device.

10. The method of claim 2, wherein the peripheral device comprises a remote control.

11. A method of selectively using extended data service (XDS) data included in a television signal, the method comprising the steps of:
    receiving a television signal by a tuner, the television signal including a video signal and an XDS signal;
    displaying a video image corresponding to the video signal on a video display coupled to the tuner;
    extracting the XDS signal from the television signal;
    sending the XDS signal out a data port to a peripheral device remote from the video display, the peripheral device comprising a computer;
    monitoring the XDS signal with the computer for URL data; and
    connecting the computer to an on-line service in response to the URL data; and
    displaying on a display independent of the video display on-line information from the on-line service simultaneously with the video image displayed on the video display.

12. A method of selectively using extended data service (XDS) data included in a television signal, the method comprising the steps of:
    receiving a television signal by a tuner, the television signal including a video signal and an XDS signal;
    displaying a program corresponding to the video signal on a video display coupled to the tuner;
    extracting the XDS signal from the television signal, the XDS signal comprising programming-related data;
    sending the XDS signal out a data port to a peripheral device remote from the video display;
    displaying the programming-related data on the peripheral device to assist in program selection; and
    automatically instructing the tuner to switch from the current program, wherein the tuner is instructed without user intervention in response to the programming-related information included in the XDS signal.

13. The method of claim 12, further comprising manually selecting parameters to allow automatic instruction of the tuner prior to automatically instructing the tuner.

14. A system for facilitating use of extended data service (XDS) data by a television user, comprising:
    a tuner adapted to receive a television signal, the television signal including a video signal and an XDS signal;
    a video display for receiving the video signal from the tuner to produce a video image;
    a data slicer coupled to the tuner for extracting the XDS signal from the television signal;
    a data port coupled to the data slicer for providing an output of the XDS signal to a peripheral device;
    an external processor coupled to the data port for monitoring the XDS signal for programming-related data to assist in program selection; and
    a controller coupled to the processor and the tuner for automated instruction of the tuner to switch from a program, the controller configured to instruct the tuner without user invention in response to the programming-related data included in the XDS signal.

15. The system of claim 14, wherein the programming-related data comprises upcoming television program information, and wherein the controller is configured for automatically controlling the tuner based upon the upcoming television program information.

16. The system of claim 14, further comprising a data port coupled to the data slicer for providing an output of the XDS signal to a peripheral device and wherein the processor comprises a computer coupled to the data slicer via the data port.

17. The system of claim 14, wherein the controller is further configured to instruct the tuner based on preselected parameters.

18. A system for facilitating use of extended data service (XDS) data by a television user, comprising:

a television comprising a tuner adapted to receive a television signal, the television signal including a video signal and an XDS signal, a video display for receiving the video signal from the tuner to produce a video image, a data slicer coupled to the tuner adapted to extract the XDS signal from the television signal, and a data port coupled to the data slicer for providing an output of the XDS signal to a peripheral device; and a computer coupled to the data port, the computer comprising a user interface for monitoring non-closed caption data in the XDS signal and displaying non-XDS signal data associated with the non-closed caption data in the XDS signal independent from the video display and simultaneously with the video image on the video display.

19. The system of claim 18, wherein the user interface comprises a display.

20. The system of claim 18, wherein the system further comprises a controller coupled to the computer and the tuner for controlling the tuner in response to programming-related data included in the XDS signal.

* * * * *